(12) United States Patent
Chen et al.

(10) Patent No.: US 8,743,447 B2
(45) Date of Patent: Jun. 3, 2014

(54) ELECTROCHROMIC DEVICE AND STORAGE DEVICE AND MANUFACTURING METHOD THEREOF

(75) Inventors: Jen-Sue Chen, Tainan (TW); Wei-Ting Wu, Tainan (TW); Jih-Jen Wu, Tainan (TW); Kun-Keng Chiang, New Taipei (TW)

(73) Assignee: National Cheng Kung University (TW)

( * ) Notice: Subject to any disclaimer, the term of this patent is extended or adjusted under 35 U.S.C. 154(b) by 181 days.

(21) Appl. No.: 13/345,999

(22) Filed: Jan. 9, 2012

(65) Prior Publication Data

US 2012/0176660 A1  Jul. 12, 2012

(30) Foreign Application Priority Data

Jan. 10, 2011  (TW) .............................. 100100873 A

(51) Int. Cl.
*G02F 1/153*  (2006.01)

(52) U.S. Cl.
USPC .......................................................... 359/275

(58) Field of Classification Search
USPC .................................... 359/265–275; 345/105
See application file for complete search history.

(56) References Cited

U.S. PATENT DOCUMENTS

| | | | | |
|---|---|---|---|---|
| 6,906,842 B2 * | 6/2005 | Agrawal et al. | ............... | 359/265 |
| 7,379,224 B2 * | 5/2008 | Tonar et al. | ................... | 359/265 |
| 8,508,832 B2 * | 8/2013 | Baumann et al. | ............. | 359/267 |

FOREIGN PATENT DOCUMENTS

JP  2007-139899 A  6/2007

OTHER PUBLICATIONS

Japanese Office Action issued Jul. 2, 2013.

\* cited by examiner

*Primary Examiner* — Tuyen Tra
(74) *Attorney, Agent, or Firm* — Volpe and Koenig, P.C.

(57) ABSTRACT

An electrochromic device is provided. The electrochromic device includes a first substrate, an electrochromic layer, an electrode, an electrolyte layer and a second substrate. The electrochromic layer is formed on the first substrate, the electrode is disposed on the electrochromic layer, and the electrolyte layer is disposed between the electrode and the second substrate.

20 Claims, 6 Drawing Sheets

ELECTROCHROMIC DEVICE AND STORAGE DEVICE AND MANUFACTURING METHOD THEREOF

FIELD OF THE INVENTION

The present invention relates to an electrochromic device, a storage device and manufacturing methods thereof, and more particularly to an allochromasia device and a storage device having multiple resistance states and multiple transmittance states, and manufacturing methods thereof.

BACKGROUND

The electrochromic technique is a new developing technique in the photoelectronic industry in recent two decades. There have been commercialized products such as the rearview mirror of Gentex corporation and the electrochromic sunglasses of Nikon. Currently, one of technique bottlenecks that many scientists and engineers want to overcome is the promotion of the electrochromic technique to a smart window generation, which uses an electrochromic glass to substitute a general glass. The most significant advantage of the mentioned techniques is power-saving. An electrochromic system has characteristics of being manually operated to block source of heat energy and wavelength of visible light, and thus can stop the persecution of the sunlight in a hot summer day, so as to reduce the use of air condition and achieve the effect of power-saving. For achieving the mentioned object, it depends on the further promotion of the electrochromic technique, so as to manufacture various products satisfying need of users in different seasons.

In another aspect, a resistive memory may have two different resistivities by applying the bias. Because the resistive memory has a simple structure and can be directly applied to the semiconductor process, it has been considered as a memory with most potential in the future. Besides, under the conditions that information capacity increases continuously and capacity of image and volume with high resolution also increases amazingly, there is an instant need of better techniques to satisfy the need of higher memory capacity and higher memory density.

For satisfying the mentioned needs, after deeply researches and analysis and numerous experiments and improvements, the inventors of the present invention has developed novel electrochromic devices, storage devices and manufacturing methods thereof, and substantially promoted performance and qualities of the products by significant techniques to benefit countless people.

SUMMARY

An electrochromic device, a storage device and manufacturing methods thereof are provided in the present invention. The electrochromic device has a function of memory, and the storage device has more than two memory configurations, which can significantly promote the memory density.

In accordance with one aspect of the present invention, an electrochromic device is provided. The electrochromic device includes a first substrate; an electrochromic layer formed on the first substrate; an electrode disposed on the electrochromic layer; a second substrate; and an electrolyte layer disposed between the electrode and the second substrate.

In accordance with another aspect of the present invention, a storage device is provided. The storage device includes a first substrate; an electrochromic layer formed on the first substrate; an electrode disposed on the electrochromic layer; a second substrate; and an electrolyte layer disposed between the electrode and the second substrate.

In accordance with a further aspect of the present invention, a method of manufacturing a storage device. The method includes following steps: providing a first substrate; forming an electrochromic layer on the first substrate; disposing an electrode on the electrochromic layer; providing a second substrate; and disposing an electrolyte layer between the second substrate and the electrochromic layer.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of embodiments of this invention are presented herein for the purposes of illustration and description only; it is not intended to be exhaustive or to be limited to the precise form disclosed.

Embodiment I

Figure 1:
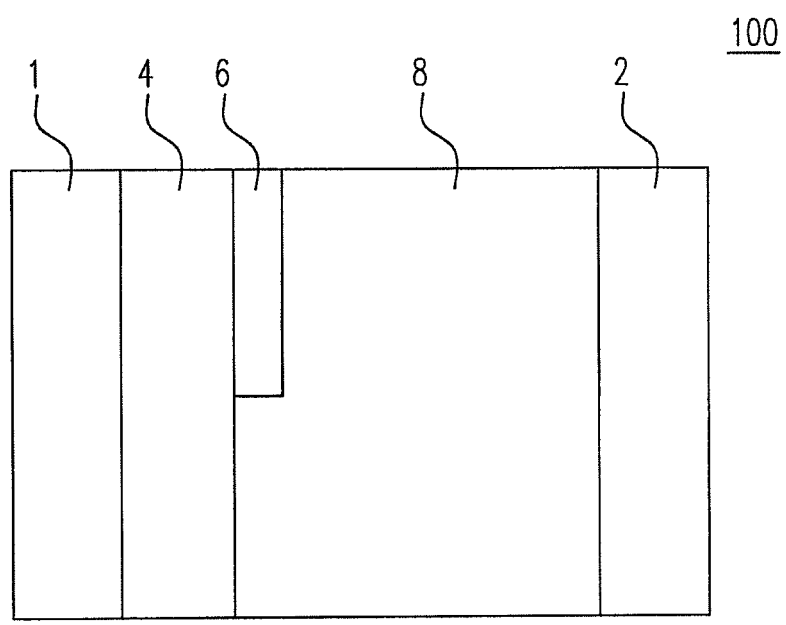
FIG. 1 is a diagram showing a cross-sectional view of the first embodiment of the storage device of the present invention.

Please refer to FIG. 1, which is a diagram showing a cross-sectional view of the first embodiment of the storage device of the present invention. The storage device 100 includes an electrochromic layer 4 formed on a first substrate 1, an electrode 6 disposed on the electrochromic layer 4, a second substrate 2 disposed opposite to the first substrate 1, and an electrolyte layer 8 disposed between the electrode 6 and the second substrate 2.

According to the mentioned embodiment, each of the first substrate 1 and the second substrate 2 may be a transparent substrate coated with a transparent conducting layer. The transparent conducting layer has a transparent conducting material such as indium tin oxide, tin oxide, fluorine-doped tin oxide, zinc oxide, aluminum-doped zinc oxide, gallium-doped zinc oxide, or titanium nitride.

The electrochromic layer 4 may include an inorganic material or an organic material. The inorganic material may include one selected from a group consisting of tungsten oxide, nickel oxide, titanium oxide, niobium oxide, zinc oxide, tantalum oxide, iron oxide, chromium oxide, manganese oxide, iridium oxide, vanadium oxide, rhodium oxide, molybdenum oxide, cobalt oxide, cerium oxide, ruthenium oxide and a combination thereof. The organic material may include one selected from a group consisting of poly(3,4-ethylenedioxythiophene) which has an abbreviated name of PEDOT, polyaniline, viologen, $KFe[Fe(CN)_6]$, $Fe_4[Fe(CN)_6]_3$, $Fe_4[Ru(CN)_6]_3$, $CoFe(CN)_6$, $InFe(CN)_6$, pyrazoline, tetrathiafulvalene and a combination thereof.

The electrode 6 may include a metal material or a transparent conducting material. The metal material may include one selected from a group consisting of aluminum, gold, platinum, silver, titanium, copper, tungsten, molybdenum, zirconium, chromium, hafnium and a combination thereof, or an alloy of at least two metals selected from the mentioned group. The transparent conducting material may include one selected from a group consisting of indium tin oxide, tin oxide, fluorine-doped tin oxide, zinc oxide, aluminum-doped zinc oxide, gallium-doped zinc oxide, titanium nitride and a combination thereof.

The electrolyte layer 8 may be an electrolytic solution or a solid electrolyte. The electrolytic solution may include at least an ion being one selected from a group consisting of a hydrogen ion, a lithium ion, a sodium ion, a potassium ion and a combination thereof. The solid electrolyte may include at least an ion and a substance, the ion may include one selected from a group consisting of a hydrogen ion, a lithium ion, a sodium ion, a potassium ion and a combination thereof, and the substance may include one selected from a group consisting of poly(perfluorosulphonic acid), poly(2-acrylamindo-2-methylpropanesulphonic acid), poly(ethylene sulphonic acid), poly(methyl methacrylate), poly(styrene sulphonic acid), poly(vinyl sulphonic acid), poly(ethylene oxide), poly(vinyl alcohol), poly(vinyl piperidine), cross-linked polyether, $Ta_2O_5$, $ZrO_2$, chromium oxide, silicon dioxide with a metal, water glass, $MgF_2$, $Li_3N$, phosphotungstic acid ($H_3PW_{12}O_{40}$), $LiAlF_4$, $LiNbO_3$ and a combination thereof.

According to the mentioned embodiment, the electrochromic layer 4 may include a contact surface having a first part and a second part (not shown in the figures), the electrode 6 covers the first part, and the second part of the electrochromic layer 4, which is not covered by the electrode 6, contacts with the electrolyte layer 8. When a voltage is applied between the first substrate 1 and the second substrate 2, an electric field may be generated. For example, when a positive voltage is applied on the second substrate 2 and a negative voltage is applied on the first substrate 1, the positive electric ion, such as $Li^+$, in the electrolyte layer 8 would move toward the first substrate 1 with the negative voltage, which causes the $Li^+$ to enter into the electrochromic layer 4 to generate an electrochromic effect. For example, if the electrochromic layer 4 includes $WO_3$, the color of the electrochromic layer 4 would change from transparent to blue black when the $Li^+$ enters into the electrochromic layer 4. The shade of color is in direct proportion with the number or concentration of the $Li^+$ in the electrochromic layer 4, and the chemical equation thereof can be represented as follows:

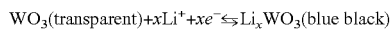
$$WO_3(transparent) + xLi^+ + xe^- \rightleftharpoons Li_xWO_3(blue\ black)$$

The mentioned equation is a reversible reaction. That is to say, when a voltage is applied in a reverse direction, the $Li^+$ would be caused to leave the electrochromic layer 4 and go back to the electrolyte layer 8. In this case, the color of the electrochromic layer 4 would turn transparent back. Since the number of the $Li^+$ entering into the electrochromic layer 4 or the concentration of the $Li^+$ in the electrochromic layer 4 is in direct proportion with the magnitude of the applied voltage, which also can be represented by the quantity of electricity on the first substrate 1 and the second substrate 2, the transmittance of the electrochromic layer 4 would be controllable by controlling the magnitude and the positive or negative values of the voltage between the first substrate 1 and the second substrate 2, i.e. controlling the quantity of electricity on the first substrate 1 and the second substrate 2. The transmittance can be measured quantitatively by using the optical absorbance or the optical density.

Figure 2A:
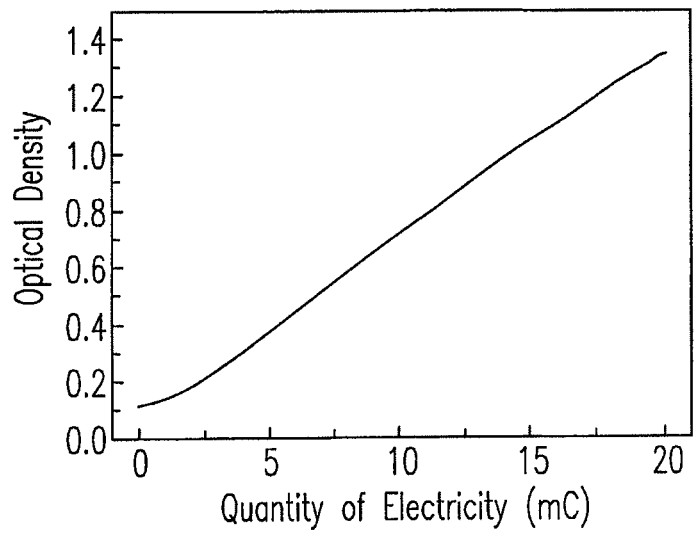
FIG. 2A is a coordinate map showing a relative relationship of the optical density and the gradually increasing quantity of electricity of the first substrate of the storage device in the first embodiment of the present invention.
Figure 2B:
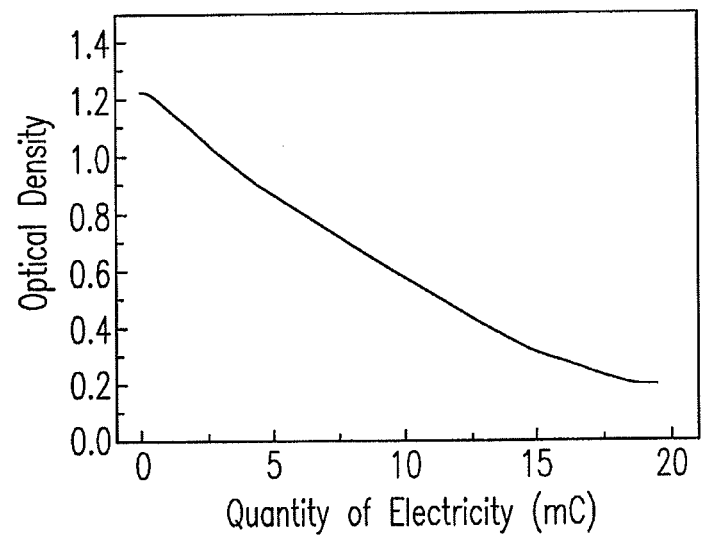
FIG. 2B is a coordinate map showing a relative relationship of the optical density and the gradually decreasing quantity of electricity of the first substrate of the storage device in the first embodiment of the present invention.

Please refer to FIG. 2A, which is a coordinate map showing a relative relationship of the optical density and the gradually increasing quantity of electricity of the first substrate of the storage device in the first embodiment of the present invention. In FIG. 2A, when the quantity of electricity of the first substrate 1 (indicated by the horizontal axis) increases gradually, the optical density (indicated by the vertical axis) increases correspondingly. Please refer to FIG. 2B, which is a coordinate map showing a relative relationship of the optical density and the gradually decreasing quantity of electricity of the first substrate 1 of the storage device in the first embodiment of the present invention. In FIG. 2B, when the quantity of electricity of the second substrate 2 (indicated by the horizontal axis) increases gradually, the optical density (indicated by the vertical axis) would decreases correspondingly and go back to the lowest value.

In another aspect, when a voltage applied between the first substrate 1 and the electrode 6 is higher than a threshold value, the resistance of the electrochromic layer 4 therebetween would decrease to a low-resistance. When the applied voltage decreases to a value lower than the threshold value, the resistance of the electrochromic layer 4 would go back to a high-resistance again. That is to say, the electrochromic layer 4 may have two kinds of resistance states by controlling the applied voltage between the first substrate 1 and the electrode 6.

According to the mentioned explanations and FIGS. 2A and 2B, the transmittance has a continuously direct proportional relationship with the applied voltage between the first substrate 1 and the second substrate 2. Therefore, under the condition that the transmittance is resoluble, the transmittance may include several transmittance states, such as five different transmittance states.

Figure 3:
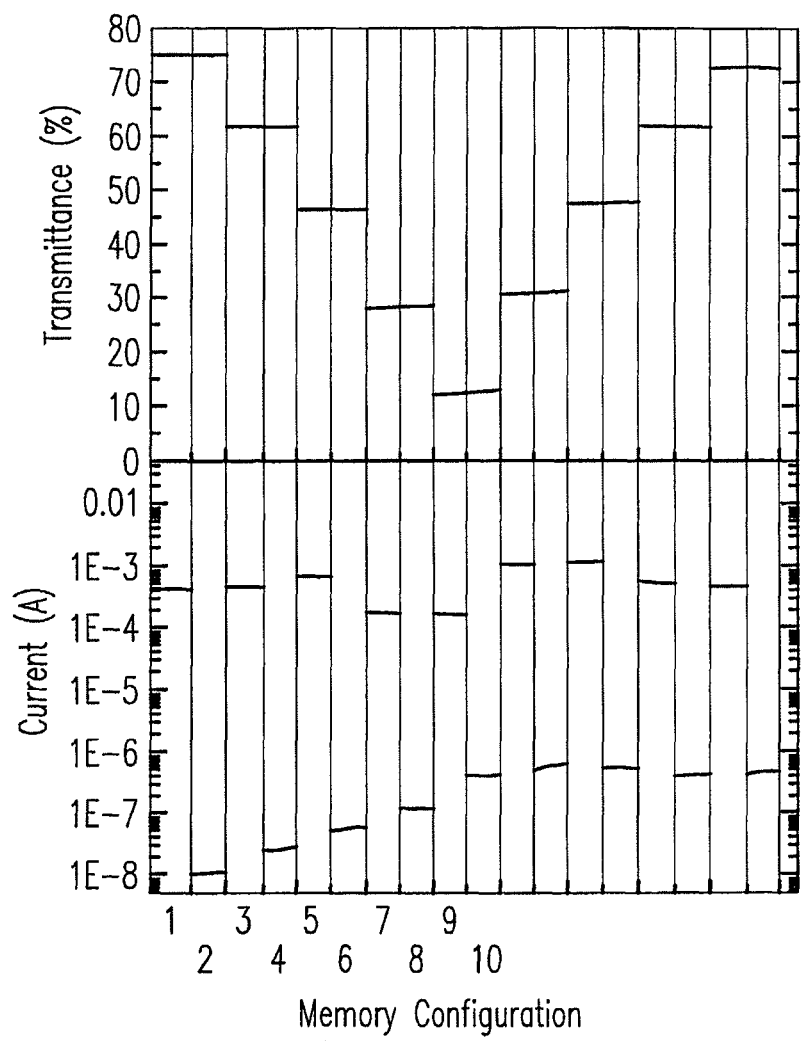
FIG. 3 is a diagram showing the multiple memory configurations of the storage device in the first embodiment of the present invention.

According to the mentioned embodiments, a combination of the five transmittance states and the two resistance states of electrochromic layer 4 may generate ten (5*2=10) kinds of the memory configurations. Please refer to FIG. 3, which is a diagram showing the multiple memory configurations of the storage device in the mentioned embodiments. In FIG. 3, the first memory configuration is consisting of the first transmittance (i.e. the brightest transmittance) and a low-resistance state; the second memory configuration is consisting of the first transmittance (i.e. the brightest transmittance) and a high-resistance state; the third memory configuration is consisting of the second transmittance (i.e. the second brightest transmittance) and a low-resistance state; the fourth memory configuration is consisting of the second transmittance (i.e. the second brightest transmittance) and a high-resistance state; the fifth memory configuration is consisting of the third transmittance (i.e. the third brightest transmittance) and a low-resistance state; the sixth memory configuration is consisting of the third transmittance (i.e. the third brightest transmittance) and a high-resistance state; the seventh memory configuration is consisting of the fourth transmittance (i.e. the fourth brightest transmittance) and a low-resistance state; the eighth memory configuration is consisting of the fourth transmittance (i.e. the fourth brightest transmittance) and a high-resistance state; the ninth memory configuration is consisting of the fifth transmittance (i.e. the darkest transmittance) and a low-resistance state; and the tenth memory configuration is consisting of the fifth transmittance (i.e. the darkest transmittance) and a high-resistance state.

FIG. 3 also shows that when the transmittance rises again and is arranged with the high or low resistance state, the storage device would get back to any of the memory configurations. In the mentioned embodiments, a single storage unit may generate ten memory configurations. However, based on the inventive concept of the present invention, as long as the transmittance can be resolved correctly, the transmittance may be divided into other numbers of transmittance states, in addition to the five transmittance states described in the mentioned embodiments. For example, when the transmittance is divided into eight different transmittance states, the single storage unit of the storage device of the present invention may generate sixteen (8*2=16) kinds of the memory configurations. That is to say, when the transmittance is divided into N states, the storage device may have 2N memory configurations. In a conventional memory, each memory unit only has two kinds of memory configurations, i.e. 0 and 1. Accordingly, compared with the conventional memory, the memory density of each unit of the storage device provided in the present invention is significantly promoted.

Embodiment II

Figure 4:
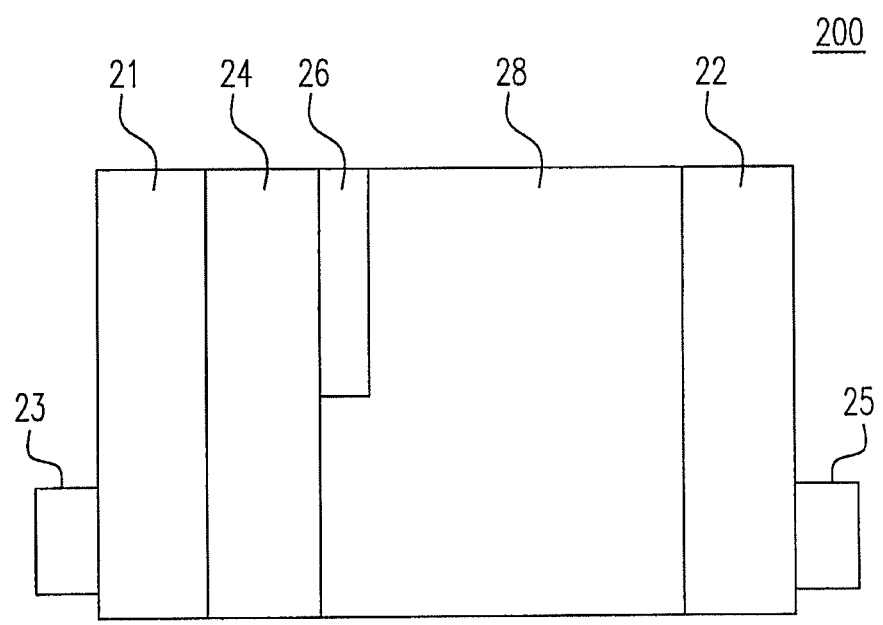
FIG. 4 is a diagram showing a cross-sectional view of the second embodiment of the storage device of the present invention.

A storage device is disclosed in the present embodiment, and a cross-sectional view thereof is shown in FIG. 4. The storage device 200 includes: an electrochromic layer 24 formed on a first substrate 21; an electrode 26 disposed on the electrochromic layer 24; a second substrate 22 disposed opposite to the first substrate 21; an electrolyte layer 28 disposed between the electrode 26 and the second substrate 22; a light-emitting element 23 disposed on the first substrate 21 and on a counter surface of a contact surface of the first substrate 21 with the electrochromic layer 24; and a light-sensing element 25 disposed on the second substrate 22 and on a counter surface of a contact surface of the second substrate 22 with the electrolyte layer 28. In this embodiment, the electrochromic layer 24 may include a contact surface having a first part and a second part (not shown in the figures), wherein the electrode 26 covers the first part, and the second part of the electrochromic layer 24, which is not covered by the electrode 26, contacts with the electrolyte layer 28. In this embodiment, the transmittance of the storage device 200 also can be controlled by the applied voltage between the first substrate 21 and the second substrate 22 (i.e. the quantity of electricity of the first substrate 21 and the second substrate 22). Since the light-emitting element 23 is disposed opposite to the light-sensing element 25, a light emitted by the light-emitting element 23 may pass through the first substrate 21, the electrochromic layer 24, the electrolyte layer 28 and the second substrate 22, and then be received by the light-sensing element 25 so as to obtain the value of the transmittance. As those described in the Embodiment I, the transmittance may be divided into N states, and thus data may be read by the light-emitting element 23 and the light-sensing element 25.

Based on the inventive concept of the present invention, it only needs that the light-emitting element 23 and the light-sensing element 25 are disposed on two sides of the electrochromic layer 24, respectively, and disposed opposite to each other. Besides, their positions can be changed with each other. That is to say, what we need is to measure the transmittance of the electrochromic layer 24, and thus the light-emitting element 23 or the light-sensing element 25 is not necessary to be disposed on the outside of the first substrate 21 or the second substrate 22.

Furthermore, the first substrate 21 and the second substrate 22 in the present embodiment may respectively include a conducting layer having the transparent conducting materials as those described in the Embodiment I, which are not repeatedly described here. Moreover, the materials of the respective electrochromic layer 24, electrode 26 and electrolyte layer 28 also have been described in the Embodiment I, which are not repeatedly described here.

Embodiment III

Figure 5:
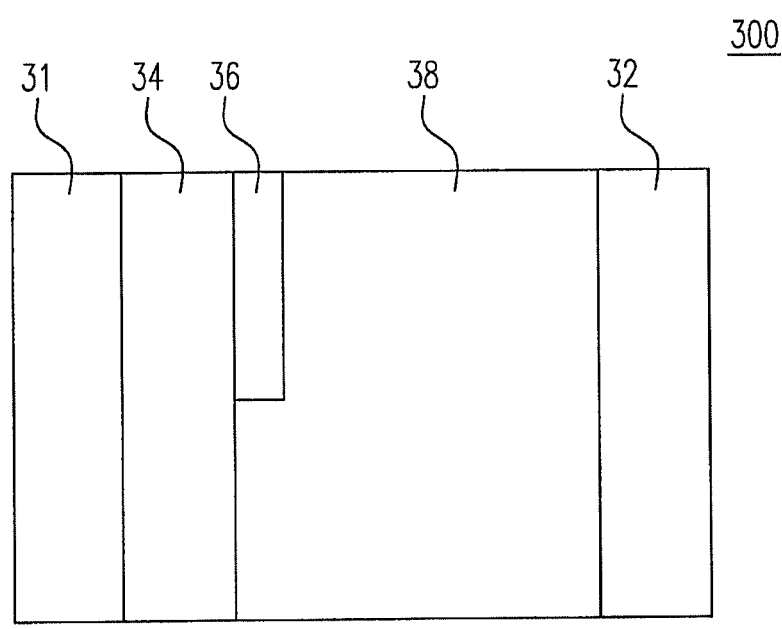
FIG. 5 is a diagram showing a cross-sectional view of the electrochromic device in a third embodiment of the present invention.

An electrochromic device is disclosed in the present embodiment, and a cross-sectional view thereof is shown in FIG. 5. The electrochromic device 300 includes an electrochromic layer 34 formed on a first substrate 31; an electrode 36 disposed on the electrochromic layer 34; a second substrate 32 disposed opposite to the first substrate 31; and an electrolyte layer 38 disposed between the electrode 36 and the second substrate 32. In the present embodiment, the electrode 36 may cover parts of the electrochromic layer 34, and the other parts thereof without being covered by the electrode 36 may contact with the electrolyte layer 38. The first substrate 31 and the second substrate 32 in the present embodiment may respectively include a conducting layer having the transparent conducting materials as those described in the Embodiment I, which are not repeatedly described here. Moreover, the materials of the respective electrochromic layer 34, electrode 36 and electrolyte layer 38 also have been described in the Embodiment I, which are not repeatedly described here.

In this embodiment, the transmittance of the electrochromic device 300 also can be controlled by the applied voltage between the first substrate 31 and the second substrate 32 (i.e. the quantity of electricity of the first substrate 31 and the second substrate 32). The electrochromic device 300 may be used in the fields of discoloration glass, intelligent curtain, electronic paper, and so on. As those described in the Embodiment I, the resistance of the electrochromic layer 34 in the present embodiment may have two kinds of resistance states through the applied voltage between the regulation electrode 36 and the first substrate 31. Accordingly, the electrochromic device 300 in the present embodiment has a memory function or a setting function, and thus can save memory data or be set according to need of users.

Embodiment IV

Figure 6:
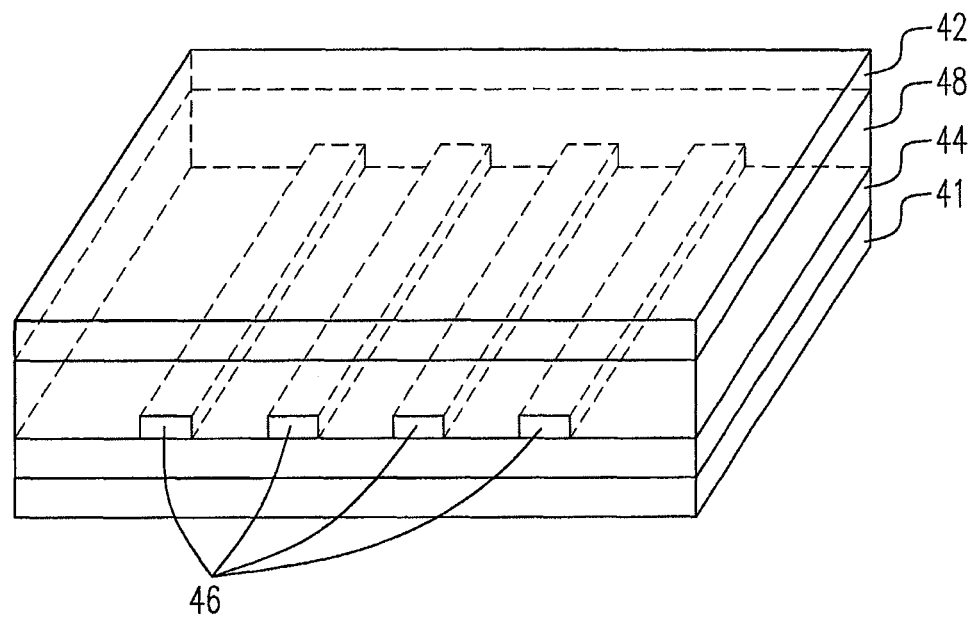
FIG. 6 is a diagram showing a three-dimensional structure of the electrochromic device in a fourth embodiment of the present invention.

Please refer to FIG. 6, which is a diagram showing a three-dimensional structure of the electrochromic device in this embodiment. As shown in FIG. 6, the electrochromic device 400 includes an electrochromic layer 44 formed on a first substrate 41; a plurality of strip-shaped electrodes 46 disposed on the electrochromic layer 44; a second substrate 42 disposed opposite to the first substrate 41; and an electrolyte layer 48 disposed between the electrodes 46 and the second substrate 42. In the present embodiment, the electrodes 46 may cover parts of the electrochromic layer 44, and the other parts thereof without being covered by the electrode 46 may contact with the electrolyte layer 48.

Similarly, the transmittance of the electrochromic device 400 also can be controlled by the applied voltage between the first substrate 41 and the second substrate 42 (i.e. the quantity of electricity of the first substrate 41 and the second substrate 42). The electrochromic device 400 may be used in the fields of discoloration glass, intelligent curtain, electronic paper, and so on. As those described in the Embodiment III, the resistance of the electrochromic layer 44 in the present embodiment may have two kinds of resistance states through the applied voltage between the regulation electrodes 46 and the first substrate 41. Accordingly, the electrochromic device 400 in the present embodiment has a memory function or a setting function, and thus can save memory data or be set according to need of users.

The following embodiments of the present invention are also provided:

1. An electrochromic device, which comprises a first substrate; an electrochromic layer formed on the first substrate; an electrode disposed on the electrochromic layer; a second substrate; and an electrolyte layer disposed between the electrode and the second substrate.

2. A device of embodiment 1, wherein the electrochromic layer includes a contact surface having a first part and a second part, the electrode covers the first part, and the second part contacts with the electrolyte layer.

3. A device of any of the preceding embodiments, wherein each of the first and second substrates includes a transparent substrate and thereon a transparent conducting layer having a transparent conducting material.

4. A device of any of the preceding embodiments, wherein the transparent conducting material includes one selected from a group consisting of indium tin oxide, tin oxide, fluorine-doped tin oxide, zinc oxide, aluminum-doped zinc oxide, gallium-doped zinc oxide, titanium nitride and a combination thereof.

5. A device of any of the preceding embodiments, wherein the electrode includes one of a metal material and a transparent conducting material.

6. A device of any of the preceding embodiments, wherein: the metal material includes one selected from a group consisting of aluminum, gold, platinum, silver, titanium, copper, tungsten, molybdenum, zirconium, chromium, hafnium and a combination thereof; and the transparent conducting material includes one selected from a group consisting of indium tin oxide, tin oxide, fluorine-doped tin oxide, zinc oxide, aluminum-doped zinc oxide, gallium-doped zinc oxide, titanium nitride and a combination thereof.

7. A device of any of the preceding embodiments, wherein the electrolyte layer includes one of an electrolytic solution and a solid electrolyte.

8. A device of any of the preceding embodiments, wherein: the electrolytic solution includes at least a first ion being one selected from a group consisting of a hydrogen ion, a lithium ion, a sodium ion, a potassium ion and a combination thereof; and the solid electrolyte includes at least a second ion and a substance, the second ion includes one selected from a group consisting of a hydrogen ion, a lithium ion, a sodium ion, a potassium ion and a combination thereof, and the substance includes one selected from a group consisting of poly(perfluorosulphonic acid), poly(2-acrylamindo-2-methylpropanesulphonic acid), poly(ethylene sulphonic acid), poly(methyl methacrylate), poly(styrene sulphonic acid), poly(vinyl sulphonic acid), poly(ethylene oxide), poly(vinyl alcohol), poly(vinyl piperidine), cross-linked polyether, $Ta_2O_5$, $ZrO_2$, chromium oxide, silicon dioxide with a metal, water glass, $MgF_2$, $Li_3N$, phosphotungstic acid ($H_3PW_{12}O_{40}$), $LiAlF_4$, $LiNbO_3$ and a combination thereof.

9. A device of any of the preceding embodiments, wherein the electrochromic layer includes one of an inorganic material and an organic material.

10. A device of any of the preceding embodiments, wherein: the inorganic material includes one selected from a group consisting of tungsten oxide, nickel oxide, titanium oxide, niobium oxide, zinc oxide, tantalum oxide, iron oxide, chromium oxide, manganese oxide, iridium oxide, vanadium oxide, rhodium oxide, molybdenum oxide, cobalt oxide, cerium oxide, ruthenium oxide and a combination thereof; and the organic material includes one selected from a group consisting of poly(3,4-ethylenedioxythiophene), polyaniline, viologen, $KFe[Fe(CN)_6]$, $Fe_4[Fe(CN)_6]_3$, $Fe_4[Ru(CN)_6]_3$, $CoFe(CN)_6$, $InFe(CN)_6$, pyrazoline, tetrathiafulvalene and a combination thereof.

11. A storage device, which comprises: a first substrate; an electrochromic layer formed on the first substrate; an electrode disposed on the electrochromic layer; a second substrate; and an electrolyte layer disposed between the electrode and the second substrate.

12. A device of any of the preceding embodiments, wherein: the electrochromic layer includes a first part and a second part, the electrode covers the first part, and the second part contacts with the electrolyte layer; each of the first and second substrates includes a transparent substrate and thereon a transparent conducting layer having a transparent conducting material; the electrode includes one of a metal material and the transparent conducting material; the electrolyte layer includes one of an electrolytic solution and a solid electrolyte; and the electrochromic layer includes one of an inorganic material and an organic material.

13. A device of any of the preceding embodiments, wherein: the transparent conducting material includes one selected from a group consisting of indium tin oxide, tin oxide, fluorine-doped tin oxide, zinc oxide, aluminum-doped zinc oxide, gallium-doped zinc oxide, titanium nitride and a combination thereof; the metal material includes one selected from a group consisting of aluminum, gold, platinum, silver, titanium, copper, tungsten, molybdenum, zirconium, chromium, hafnium and a combination thereof; the electrolytic solution includes at least a first ion being one selected from a group consisting of a hydrogen ion, a lithium ion, a sodium ion, a potassium ion and a combination thereof; the solid electrolyte includes at least a second ion and a substance, the second ion includes one selected from a group consisting of a hydrogen ion, a lithium ion, a sodium ion, a potassium ion and a combination thereof, and the substance includes one selected from a group consisting of poly(perfluorosulphonic acid), poly(2-acrylamindo-2-methylpropanesulphonic acid), poly(ethylene sulphonic acid), poly(methyl methacrylate), poly(styrene sulphonic acid), poly(vinyl sulphonic acid), poly(ethylene oxide), poly(vinyl alcohol), poly(vinyl piperidine), cross-linked polyether, $Ta_2O_5$, $ZrO_2$, chromium oxide, silicon dioxide with a metal, water glass, $MgF_2$, $Li_3N$, phosphotungstic acid ($H_3PW_{12}O_{40}$), $LiAlF_4$, $LiNbO_3$ and a combination thereof; the inorganic material includes one selected from a group consisting of tungsten oxide, nickel oxide, titanium oxide, niobium oxide, zinc oxide, tantalum oxide, iron oxide, chromium oxide, manganese oxide, iridium oxide, vanadium oxide, rhodium oxide, molybdenum oxide, cobalt oxide, cerium oxide, ruthenium oxide and a combination thereof; and the organic material includes one selected from a group consisting of poly(3,4-ethylenedioxythiophene), polyaniline, viologen, $KFe[Fe(CN)_6]$, $Fe_4[Fe(CN)_6]_3$, $Fe_4[Ru(CN)_6]_3$, $CoFe(CN)_6$, $InFe(CN)_6$, pyrazoline, tetrathiafulvalene and a combination thereof.

14. A device of any of the preceding embodiments, further comprising a resistance between the first substrate and the electrode, wherein the resistance is regulated by a first voltage to have at least a low-resistance state and a high-resistance state.

15. A device of any of the preceding embodiments, further comprising a first voltage between the first and the second substrates and a second voltage, wherein the first voltage is regulated by the second voltage so as to cause the electrochromic layer to include N different transmittances being resoluble, the N is one of integers larger than and equal to 2, and the device further comprises at least 2N memory configurations.

16. A device of any of the preceding embodiments, wherein the electrochromic layer includes a first side and a second side opposite to the first side, and the device further comprises: a light-emitting element disposed on the first side; and a light-sensing element disposed on the second side and opposite to the light-emitting element, so that when the electrochromic layer is one of transparent and translucent layers, the light-emitting element emits a light passing through the electrochromic layer and received by the light-sensing element.

17. A device of any of the preceding embodiments, wherein the first substrate includes a first surface relatively far away from the electrochromic layer, the second substrate includes a second surface relatively far away from the electrolyte layer, the light-sensing element is disposed on the first surface, and the light-emitting element is disposed on the second surface.

18. A method of manufacturing a storage device, comprising steps of: providing a first substrate; forming an electrochromic layer on the first substrate; disposing an electrode on the electrochromic layer; providing a second substrate; and disposing an electrolyte layer between the second substrate and the electrochromic layer.

19. A method of embodiment 18, wherein the electrochromic layer includes a contact surface having a first part and a second part, a first side and a second side opposite to the first side, and the method further comprises steps of: causing the electrode to cover the first part, and the second part to contact with the electrolyte layer; disposing a light-emitting element on the first side; disposing a light-sensing element on the second side and opposite to the light-emitting element, so that when the electrochromic layer is one of transparent and translucent layers, the light-emitting element emits a light passing through the electrochromic layer and received by the light-sensing element.

20. A method of any of embodiments 18-19, wherein the first substrate includes a first surface relatively far away from the electrochromic layer, the second substrate includes a second surface relatively far away from the electrolyte layer, and the method further comprises steps of: disposing the light-sensing element on the first surface; and disposing the light-emitting element on the second surface.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An electrochromic device, comprising:
a first substrate;
an electrochromic layer having an upper surface and a lateral surface and formed on the first substrate;
an electrode disposed on the upper surface of the electrochromic layer;
a second substrate; and
an electrolyte layer disposed between the electrode and the second substrate.

2. A device as claimed in claim 1, wherein the electrochromic layer includes a contact surface having a first part and a second part, the electrode covers the first part, and the second part contacts with the electrolyte layer.

3. A device as claimed in claim 1, wherein each of the first and second substrates includes a transparent substrate and thereon a transparent conducting layer having a transparent conducting material.

4. A device as claimed in claim 3, wherein the transparent conducting material includes one selected from a group consisting of indium tin oxide, tin oxide, fluorine-doped tin oxide, zinc oxide, aluminum-doped zinc oxide, gallium-doped zinc oxide, titanium nitride and a combination thereof.

5. A device as claimed in claim 1, wherein the electrode includes one of a metal material and a transparent conducting material.

6. A device as claimed in claim 5, wherein:
the metal material includes one selected from a group consisting of aluminum, gold, platinum, silver, titanium, copper, tungsten, molybdenum, zirconium, chromium, hafnium and a combination thereof; and
the transparent conducting material includes one selected from a group consisting of indium tin oxide, tin oxide, fluorine-doped tin oxide, zinc oxide, aluminum-doped zinc oxide, gallium-doped zinc oxide, titanium nitride and a combination thereof.

7. A device as claimed in claim 1, wherein the electrolyte layer includes one of an electrolytic solution and a solid electrolyte.

8. A device as claimed in claim 7, wherein:
the electrolytic solution includes at least a first ion being one selected from a group consisting of a hydrogen ion, a lithium ion, a sodium ion, a potassium ion and a combination thereof; and
the solid electrolyte includes at least a second ion and a substance, the second ion includes one selected from a group consisting of a hydrogen ion, a lithium ion, a sodium ion, a potassium ion and a combination thereof, and the substance includes one selected from a group consisting of poly(perfluorosulphonic acid), poly(2-acrylamindo-2-methylpropanesulphonic acid), poly(ethylene sulphonic acid), poly(methyl methacrylate), poly(styrene sulphonic acid), poly(vinyl sulphonic acid), poly(ethylene oxide), poly(vinyl alcohol), poly(vinyl piperidine), cross-linked polyether, $Ta_2O_5$, $ZrO_2$, chromium oxide, silicon dioxide with a metal, water glass, $MgF_2$, $Li_3N$, phosphotungstic acid ($H_3PW_{12}O_{40}$), $LiAlF_4$, $LiNbO_3$ and a combination thereof.

9. A device as claimed in claim 1, wherein the electrochromic layer includes one of an inorganic material and an organic material.

10. A device as claimed in claim 9, wherein:
the inorganic material includes one selected from a group consisting of tungsten oxide, nickel oxide, titanium oxide, niobium oxide, zinc oxide, tantalum oxide, iron oxide, chromium oxide, manganese oxide, iridium oxide, vanadium oxide, rhodium oxide, molybdenum oxide, cobalt oxide, cerium oxide, ruthenium oxide and a combination thereof; and
the organic material includes one selected from a group consisting of poly(3,4-ethylenedioxythiophene), polyaniline, viologen, $KFe[Fe(CN)_6]$, $Fe_4[Fe(CN)_6]_3$, $Fe_4[Ru$ (CN)$_6$]$_3$, CoFe(CN)$_6$, InFe(CN)$_6$, pyrazoline, tetrathiafulvalene and a combination thereof.

11. A storage device, comprising:
a first substrate;
an electrochromic layer having an upper surface and a lateral surface and formed on the first substrate;
an electrode disposed on the upper surface of the electrochromic layer;
a second substrate; and
an electrolyte layer disposed between the electrode and the second substrate.

12. A device as claimed in claim 11, wherein:
the electrochromic layer includes a first part and a second part, the electrode covers the first part, and the second part contacts with the electrolyte layer;
each of the first and second substrates includes a transparent substrate and thereon a transparent conducting layer having a transparent conducting material;
the electrode includes one of a metal material and the transparent conducting material;
the electrolyte layer includes one of an electrolytic solution and a solid electrolyte; and
the electrochromic layer includes one of an inorganic material and an organic material.

13. A device as claimed in claim 12, wherein:
the transparent conducting material includes one selected from a group consisting of indium tin oxide, tin oxide, fluorine-doped tin oxide, zinc oxide, aluminum-doped zinc oxide, gallium-doped zinc oxide, titanium nitride and a combination thereof;
the metal material includes one selected from a group consisting of aluminum, gold, platinum, silver, titanium, copper, tungsten, molybdenum, zirconium, chromium, hafnium and a combination thereof;
the electrolytic solution includes at least a first ion being one selected from a group consisting of a hydrogen ion, a lithium ion, a sodium ion, a potassium ion and a combination thereof;
the solid electrolyte includes at least a second ion and a substance, the second ion includes one selected from a group consisting of a hydrogen ion, a lithium ion, a sodium ion, a potassium ion and a combination thereof, and the substance includes one selected from a group consisting of poly(perfluorosulphonic acid), poly(2-acrylamindo-2-methylpropanesulphonic acid), poly(ethylene sulphonic acid), poly(methyl methacrylate), poly(styrene sulphonic acid), poly(vinyl sulphonic acid), poly(ethylene oxide), poly(vinyl alcohol), poly(vinyl piperidine), cross-linked polyether, Ta$_2$O$_5$, ZrO$_2$, chromium oxide, silicon dioxide with a metal, water glass, MgF$_2$, Li$_3$N, phosphotungstic acid (H$_3$PW$_{12}$O$_{40}$), LiAlF$_4$, LiNbO$_3$ and a combination thereof;
the inorganic material includes one selected from a group consisting of tungsten oxide, nickel oxide, titanium oxide, niobium oxide, zinc oxide, tantalum oxide, iron oxide, chromium oxide, manganese oxide, iridium oxide, vanadium oxide, rhodium oxide, molybdenum oxide, cobalt oxide, cerium oxide, ruthenium oxide and a combination thereof; and
the organic material includes one selected from a group consisting of poly(3,4-ethylenedioxythiophene), polyaniline, viologen, KFe[Fe(CN)$_6$], Fe$_4$[Fe(CN)$_6$]$_3$, Fe$_4$[Ru(CN)$_6$]$_3$, CoFe(CN)$_6$, InFe(CN)$_6$, pyrazoline, tetrathiafulvalene and a combination thereof.

14. A device as claimed in claim 11, wherein the first substrate and the electrode have a first and a second resistances therebetween, the first and the second resistances are regulated by a first voltage to cause the electrochromic layer to be in one of a low-resistance state when the first resistance exists between the first substrate and the electrode and a high-resistance state when the second resistance exists between the first substrate and the electrode, and the first resistance is lower than the second resistance.

15. A device as claimed in claim 11, further comprising a first voltage between the first and the second substrates and a second voltage, wherein the first voltage is regulated by the second voltage so as to cause the electrochromic layer to include N different transmittances being resoluble, the N is one of integers larger than and equal to 2, and the device further comprises at least 2N memory configurations.

16. A device as claimed in claim 11, wherein the electrochromic layer includes a first side and a second side opposite to the first side, and the device further comprises:
a light-emitting element disposed on the first side; and
a light-sensing element disposed on the second side and opposite to the light-emitting element, so that when the electrochromic layer is one of transparent and translucent layers, the light-emitting element emits a light passing through the electrochromic layer and received by the light-sensing element.

17. A device as claimed in claim 16, wherein the first substrate includes a first surface relatively far away from the electrochromic layer, the second substrate includes a second surface relatively far away from the electrolyte layer, the light-sensing element is disposed on the first surface, and the light-emitting element is disposed on the second surface.

18. A method of manufacturing a storage device, comprising steps of:
providing a first substrate;
forming an electrochromic layer on the first substrate, wherein the electrochromic layer has an upper surface and a lateral surface;
disposing an electrode on the upper surface of the electrochromic layer;
providing a second substrate; and
disposing an electrolyte layer between the second substrate and the electrochromic layer.

19. A method as claimed in claim 18, wherein the electrochromic layer includes a contact surface having a first part and a second part, a first side and a second side opposite to the first side, and the method further comprises steps of:
causing the electrode to cover the first part, and the second part to contact with the electrolyte layer;
disposing a light-emitting element on the first side;
disposing a light-sensing element on the second side and opposite to the light-emitting element, so that when the electrochromic layer is one of transparent and translucent layers, the light-emitting element emits a light passing through the electrochromic layer and received by the light-sensing element.

20. A method as claimed in claim 19, wherein the first substrate includes a first surface relatively far away from the electrochromic layer, the second substrate includes a second surface relatively far away from the electrolyte layer, and the method further comprises steps of:
disposing the light-sensing element on the first surface; and
disposing the light-emitting element on the second surface.

* * * * *